(12) United States Patent
Karlsson et al.

(10) Patent No.: US 8,228,811 B2
(45) Date of Patent: Jul. 24, 2012

(54) ENHANCED UPLINK RETRANSMISSION SECURING

(75) Inventors: Patrik Karlsson, Alta (SE); Joe Constantine, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 862 days.

(21) Appl. No.: 12/300,509

(22) PCT Filed: May 17, 2006

(86) PCT No.: PCT/SE2006/050129
§ 371 (c)(1),
(2), (4) Date: Nov. 12, 2008

(87) PCT Pub. No.: WO2007/133134
PCT Pub. Date: Nov. 22, 2007

(65) Prior Publication Data
US 2009/0181686 A1    Jul. 16, 2009

(51) Int. Cl.
*G01R 31/08* (2006.01)
*H04W 4/00* (2009.01)

(52) U.S. Cl. ........................... 370/252; 370/329

(58) Field of Classification Search .................. None
See application file for complete search history.

(56) References Cited

U.S. PATENT DOCUMENTS

| | | | |
|---|---|---|---|
| 2005/0030953 A1* | 2/2005 | Vasudevan et al. | 370/395.4 |
| 2005/0207359 A1* | 9/2005 | Hwang et al. | 370/278 |
| 2006/0203821 A1* | 9/2006 | Mizusawa et al. | 370/392 |

OTHER PUBLICATIONS

3GPP TS 25.321 V 6/8/0 (Mar. 2006) Technical Specification 3rd Generation Partnership Project; Technical Specification Group Radio Access Network: Medium Access Control (MAC) protocol specification (Release 6) [online] Retrieved on Feb. 14, 2007 from the Internet: http://www.3gpp.org/ftp/Specs/html-info/25321.htm.esp. section 9.2.5.

Nokia. FDD Enhanced Uplink, Support for Pre-emption. 3GPP R2-041359. 3rd Generation Partnership Project; Mobile Competence Centre. Sophia Antipolis France. Jun. 17, 2004.

* cited by examiner

*Primary Examiner* — Nittaya Juntima

(57) ABSTRACT

A method, network node, and base station for communicating with mobile user terminals over an air interface. A scheduler allocates and de-allocates resources in the node or base station for communicating with a user terminal. The scheduler includes a delayer for delaying the de-allocation of an allocated resource if delayed de-allocation is needed.

6 Claims, 3 Drawing Sheets

ENHANCED UPLINK RETRANSMISSION SECURING

TECHNICAL FIELD OF THE INVENTION

The present invention relates to the field of radio telecommunications, and in particular hardware allocation in a network node and a method therefore.

DESCRIPTION OF RELATED ART

The present invention finds application particularly in third-generation networks of Wideband Code division Multiple Access (WCDMA) type. However, the techniques may be applicable also in connection with other types of radio networks, such as GSM, CDMA etc.

In radio telecommunications networks, a node B, as it is named in WCDMA, or more generally a radio base station (RBS), provides a radio, or air interface to a mobile user terminal, or user equipment. The node B is connected to a Radio Network Controller (RNC) which is the network element responsible for control of radio resources in the universal mobile telephony system (UMTS) Radio Access Network (UTRAN). The RNC is in turn connected to a Core Network (CN) which may comprise a number of different network nodes, such as MSC/VLR, SGSN etc.

In third-generation radio access networks increased transmission rates has been a primary goal and new protocols and techniques for achieving increased transmission rates has been developed. A High Speed Downlink Packet Access (HSDPA) protocol has been standardised in WCDMA release 5, and recently it has been complemented by a High Speed Uplink Packet Access (HSUPA) protocol in WCDMA release 6.

In HSUPA different user equipment is assigned different transmission rates, or Grants, ranging from 0 kbps up to 5.76 Mbps. That is, one user may have a larger Grant than another. To support the transmissions, hardware is allocated in hardware pools in the Node B and hardware resources are allocated from the pool to a particular user to support the transmission rate required. The larger the transmission rates, the more hardware resources required.

Since the resources in Node B, that is for instance hardware resources, uplink air interface resources, and link resources between the Node B and the RNC, are limited it is not guaranteed that all users will get the requested transmission rate. Instead a Scheduler in Node B will allocate resources to user equipment according to defined schemes.

In case of an overload situation, or if the scheduler for one reason or another needs to reschedule resources from one user to another, the Node B will send a new Grant to the user which should reduce its transmission rate ordering a new, lower transmission rate. Thus resources in the Node B are freed to reduce load in case of an overload situation, or to allocate to another user requiring higher transmission rate.

Due to different reasons, not all transmissions over the air interface are successful. Therefore, a retransmission scheme is defined comprising acknowledgement (ACK/NACK) signals indicating if the Node B was able, or not, to decode signals or transmissions from the user equipment. A specific transmission may be retransmitted a defined number of times, for instance 4 times. If the Node B is still unable to correctly receive the transmission after the specified number of retransmissions an RLC retransmission is initiated which involves the RNC.

SUMMARY OF THE INVENTION

In the 3GPP standard TS 25.321 it is specified that any retransmissions shall be transmitted with the original transmission rate. That is, if user equipment receives a new Grant reducing the transmission rate, any retransmissions can be sent with the original, higher transmission rate limitation. This may cause problems in the Node B. For instance, if the hardware required for this re-transmission rate is not available, there will not be any benefits with additional re-transmissions, since they can not be received properly. Consequently, only more system interference is caused, and higher layer RLC re-transmissions will be required anyway.

One object according to an aspect of the present invention is to reduce the risk of RLC retransmissions.

Another object according to an aspect of the present invention is to improve the quality of service for the radio telecommunications network.

These objects among others are, according to a one aspect of the present invention, attained by a network node comprising an air interface for communication with mobile user terminals, a hardware pool comprising hardware resources for communication with the mobile user terminal over the air interface, and a scheduler for allocating or de-allocating at least a first hardware resource, from the pool of hardware resources, for communication with a first mobile user terminal over the air interface.

The scheduler further comprises a delayer provided to delay the de-allocation of an allocated hardware resource if delayed de-allocation of the hardware resource is needed.

These objects among others are, according to another aspect of the present invention, attained by a method for allocation and de-allocation of hardware in a network node, wherein the network node comprises an air interface for communication with a mobile user terminal. The method comprises the steps of: —allocating hardware resources in the network node for receiving data from the mobile user terminal with the first transmission rate, —sending a first grant message, indicating a first allocated transmission rate, to a first mobile user terminal, —receiving an indication that the first allocated transmission rate is too large, —sending a second grant message, indicating a second lower transmission rate, to the first mobile user terminal, —de-allocating previously allocated hardware resources not needed to support the second lower transmission rate, only after the first mobile user terminal has seized to utilise the first allocated transmission rate.

These objects among others are, according to a another aspect of the present invention, attained by a base station comprising an air interface for communication with a user equipment, multiple hardware resources provided to support transmissions to and from the user equipment over the air interface, a scheduler for allocation and/or de-allocation of a particular hardware resource of the hardware resources for communication with a particular user equipment, The scheduler is further provided to not de-allocate a particular hardware resource from particular user equipment until all retransmissions are finished.

The present inventors, having realized the problems mentioned above suggests to not de-allocate the hardware resources supporting the original higher transmission rate in the Node B until any retransmissions are finished as described above. The Node B will then be able to decode the retransmissions sent with the higher transmission rate and thus avoid an RLC retransmission, involving significantly longer delays and thus reduced quality of service for the user equipment.

According to one aspect of the invention the delayer is a timer provided to delay the de-allocation of the hardware resource a predetermined time.

If a maximum time for retransmission is known the scheduler can be provided with a timer set to the maximum time allowed for retransmission. When the timer has lapsed it is safe to de-allocate the hardware since no retransmission can be pending by that time. One drawback with this implementation is that it is non-optimal with regards to hardware utilisation.

According to another aspect of the invention the network node comprises a detector provided to detect if the mobile user terminal will continue to utilise the allocated hardware, and the delayer is provided to delay the de-allocation of the hardware until the mobile user terminal has stopped utilising the allocated hardware.

According to another aspect of the invention the detector is provided to detect if the mobile user terminal has pending retransmissions, and the delayer is provided to delay the de-allocation of the hardware resource until the retransmissions are finished.

By providing the scheduler with a detector for detecting if the particular user equipment is retransmitting it is possible to de-allocate the hardware resources in an efficient manner. For user equipment not in retransmission mode it is also possible to de-allocate the hardware immediately, without any delay which provides a good utilisation of the available resources.

The detector could for instance be a simple flag which is set in the network node, or base station, whenever a NACK, that is, a negative acknowledgement, is sent to the user equipment. In one embodiment a counter, counting the number of retransmissions, could be provided.

According to another aspect of the invention the timer is provided to delay the de-allocation of the hardware resource until pending retransmissions are finished.

A combination of detector and timer could be used so that a timer is used for de-allocation only where retransmissions are pending. In this way hardware may be de-allocated immediately if no retransmissions are pending which provides for more optimal hardware utilisation.

According to another aspect of the invention said timer is set to a value which is less than or equal to the time for completing the maximum number of re-transmissions.

If the timer is set to a value equal to the maximum number of re-transmissions the hardware is allocated to secure all re-transmissions. However, for some cases the first, second or following re-transmissions will be successful. For these cases, a non-optimal utilisation of the resources is achieved if the hardware is allocated for the maximum time. Therefore, an operator might want to set the timer to a lower value to allow for some re-transmissions, but also consider resource utilization issues.

According to another aspect of the invention the network node is provided to allocate a first transmission rate to a first mobile user terminal by sending a grant message, indicating the first rate, to the first mobile terminal over the air interface and allocating sufficient hardware resources from the hardware pool to receive data transmitted from the first mobile user terminal to the network node with the first transmission rate.

The scheduler is provided to receive an indication that the allocated transmission rate for the first mobile user terminal is too large and to allocate a second transmission rate to the first mobile user, upon reception of such an indication, where the second transmission rate is lower than the first transmission rate, by sending a grant message, indicating the second rate, to the first mobile terminal over the air interface.

The scheduler working as the delayer is provided to de-allocate hardware resources not required for transmitting with the second transmission rate only after all retransmissions are finished for the first mobile user terminal.

According to another aspect of the invention the network node is provided to receive requests for transmission rate capacity from at least a second mobile user terminal, and the scheduler is provided to indicate that the allocated transmission rate for the first mobile user terminal is too large if the at least second mobile user terminal is in need of increased transmission rate.

One reason for de-allocation hardware resources from a user equipment can be that it should be utilised by another user equipment, for instance for fairness reasons.

According to another aspect of the invention the network node comprises an overload detector provided to indicate that the allocated transmission rate for the first mobile user terminal is too large if an overload situation occurs.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 5, which are given by way of illustration only, and thus are not limitative of the present invention.

DESCRIPTION OF PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
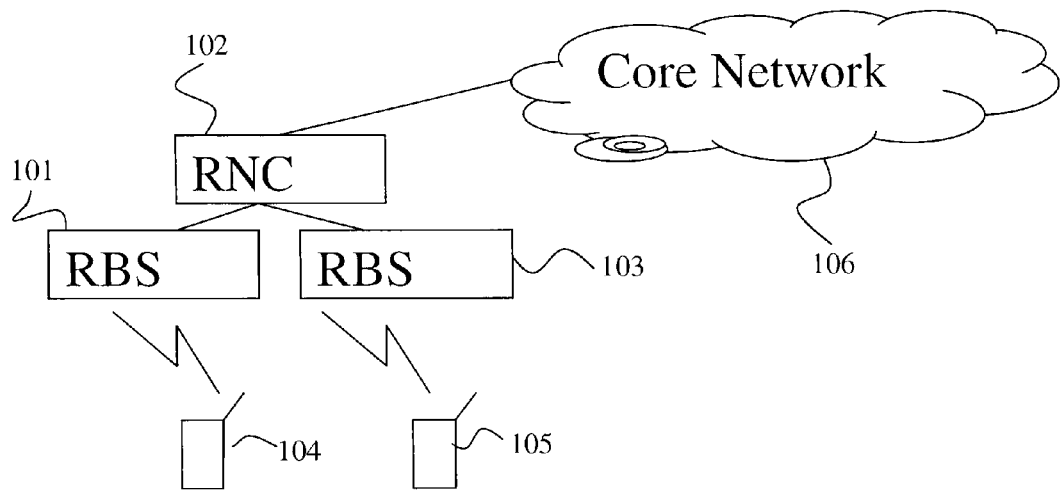
FIG. 1 is a schematic block diagram of a radio telecommunications network according to the invention.

FIG. 1 is a schematic block diagram of a small part of a radio telecommunications network. A first radio base station (RBS) 101 is connected to a radio network controller (RNC) 102. A second RBS 103 is also connected to the RNC 102 and generally many RBS may be connected to one RNC. The RBS 101 and RBS 102 provide a radio air interface to mobile terminals or user equipments, of which a first 104 and a second 105 are shown in FIG. 1. The RNC 102 and the RBS 101 and 103 constitute what is sometimes called a UMTS radio access network (UTRAN). The UTRAN may of course comprise many more RNC and RBS nodes. The RNC 102 is further connected to a Core Network (CN) 106 depicted in FIG. 1 as a cloud. The core network comprises many different network nodes, such as Mobile Switching Center (MSC), Visiting Location Register (VLR), Home Location Register (HLR) etc, which are not shown here but are well known to the skilled man. The core network is commonly connected to external networks such as PLMN, Internet etc.

Figure 2:
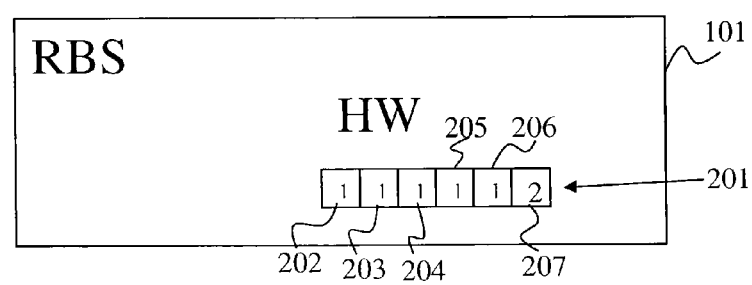
FIG. 2 is a schematic block diagram of a radio base station, also known as a Node B in WCDMA, comprising a hardware pool, and two user equipments.
Figure 2:
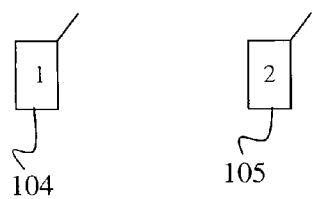

FIG. 2 is a schematic block diagram of the RBS 101 in FIG. 1 where a hardware pool 201 is shown comprising first to seventh hardware (HW) resources 202 to 207. Naturally, an RBS comprises many more HW resources, even though only seven are shown here. Also visible in FIG. 2 is that the first to sixths HW resource are allocated to the first user equipment (UE) 104 and the seventh HW resource is allocated to the second user equipment (UE) 105. The first UE 104 has been granted a higher transmission rate than the second UE 105 and has consequently been allocated significantly more hardware to cope with the higher transmission rate.

The second UE 105 is however in need of higher transmission rate than currently granted and will therefore send a request to the RBS 101 for an increased grant as is described in connection with FIG. 3 below. In this example all HW resources has already been allocated and the only way to grant the second UE 105 higher transmission rate is to decrease the currently granted transmission rate for the first UE 104.

Figure 3:
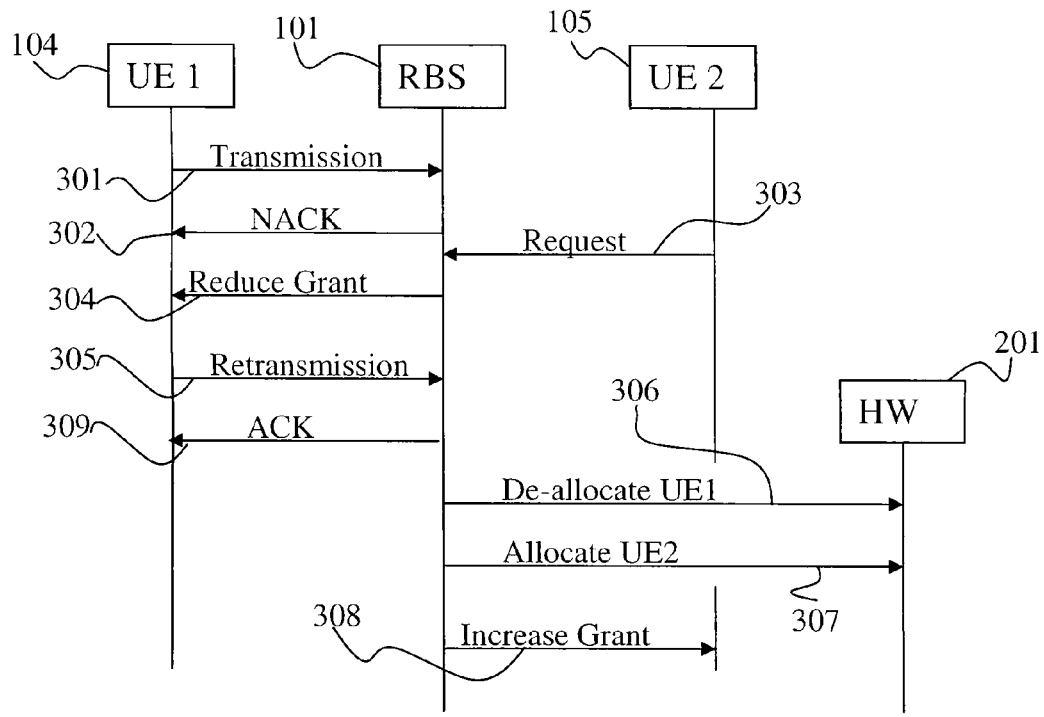
FIG. 3 is a signalling diagram according to one embodiment of the invention.

FIG. 3 is a schematic signaling diagram according to one embodiment of the invention. The first UE 104 sends data to RBS 101, however for some reasons RBS 101 is unable to decode the transmission and sends a NACK message 302 to the first UE 104. At the same time RBS 101 receives a request message 303 from the second UE 105, requesting a greater transmission rate. The RBS 101 evaluates the request and arrives at the conclusion that it needs to reschedule hardware resources from the first UE 104 to the second UE 105. However, RBS 101 also notes that the first UE 104 have pending retransmissions.

Thus, the RBS 101 sends a reduced Grant message 304 to the first UE 104 indicating the new lower allowed transmission rate but instead of de-allocating the corresponding hardware immediately, the RBS 101 monitors the pending retransmissions from the first UE 104. When all pending retransmissions has been successfully received 305, confirmed by ACK message 309, the RBS 101 de-allocates 306 the hardware associated with the first UE 104, which is not needed to support the new lower transmission rate. The RBS also allocates 307 new hardware to the second UE to support the new increased transmission rate, and sends an increased grant message 308 to the second UE 105. According to one variant of the invention messages 306 and 307 for allocation and de-allocation of hardware can instead be sent as one message to the HW handler. Such a message may in such case comprise a number of de-allocation and allocation instructions. The hardware handler would then first handle the de-allocation to thereafter use the so de-allocated hardware for allocation to the requesting users in the message.

This way the RBS 101 is able to successfully receive the retransmissions from the first UE 104 since the hardware is not de allocated until all retransmissions, which might require all the allocated hardware, are finished.

According to one variation of the invention the RBS does not monitor the pending transmissions but rather sets a timer to a specific time value, and when the timer has lapsed the de-allocation message 306 is sent. If the first UE 104 is only allowed a specified number of retransmissions the maximum time for retransmissions is known and the time value can be selected so that all retransmissions are with certainty finished.

According to yet another variant of the present invention the RBS 101 may monitor the transmission rate used by the UE 104 for the re-transmissions. If that rate is lower than the new lower transmission rate, the hardware can safely be de-allocated.

Figure 4:
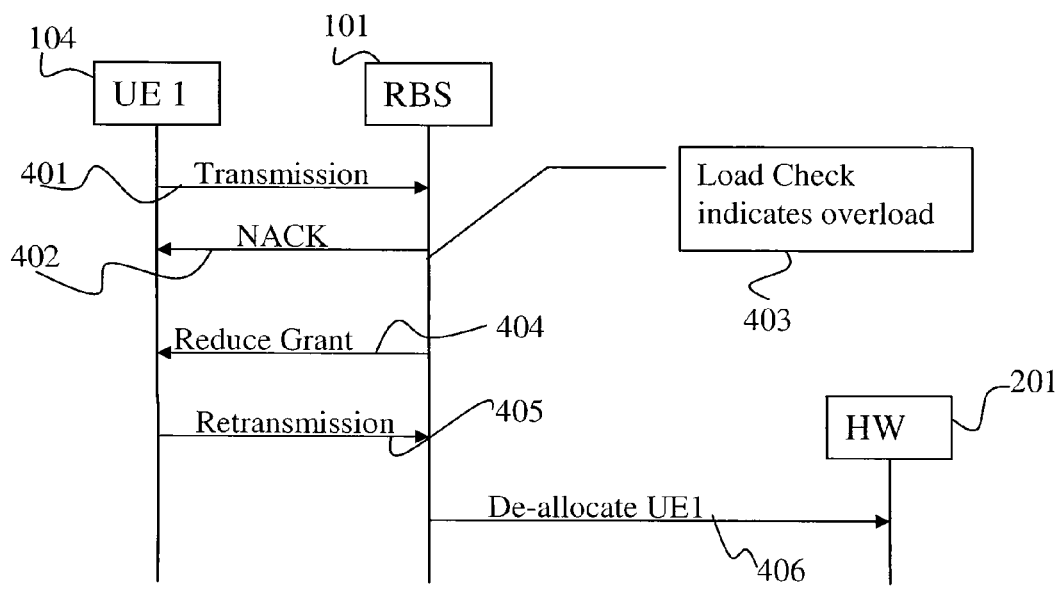
FIG. 4 is a signalling diagram according to another embodiment of the invention.

FIG. 4 is a schematic signaling diagram according to one aspect of the present invention. The first UE 104 sends data to RBS 101, however for some reasons RBS 101 is unable to decode the transmission 401 and sends a NACK message 402 to the first UE 104. At the same time a load check process in the RBS 101 indicates an overload situation 403 relating to the hardware situation. Since an overload exists, the RBS needs to reduce the granted transmission rate for the first UE 104 and de-allocate corresponding hardware. However, since the first UE 104 has retransmissions, the RBS 101 sends a reduced grant message 404 but without de-allocating the corresponding hardware. When the retransmission has finished 405 the corresponding hardware is de-allocated 406.

Figure 5:
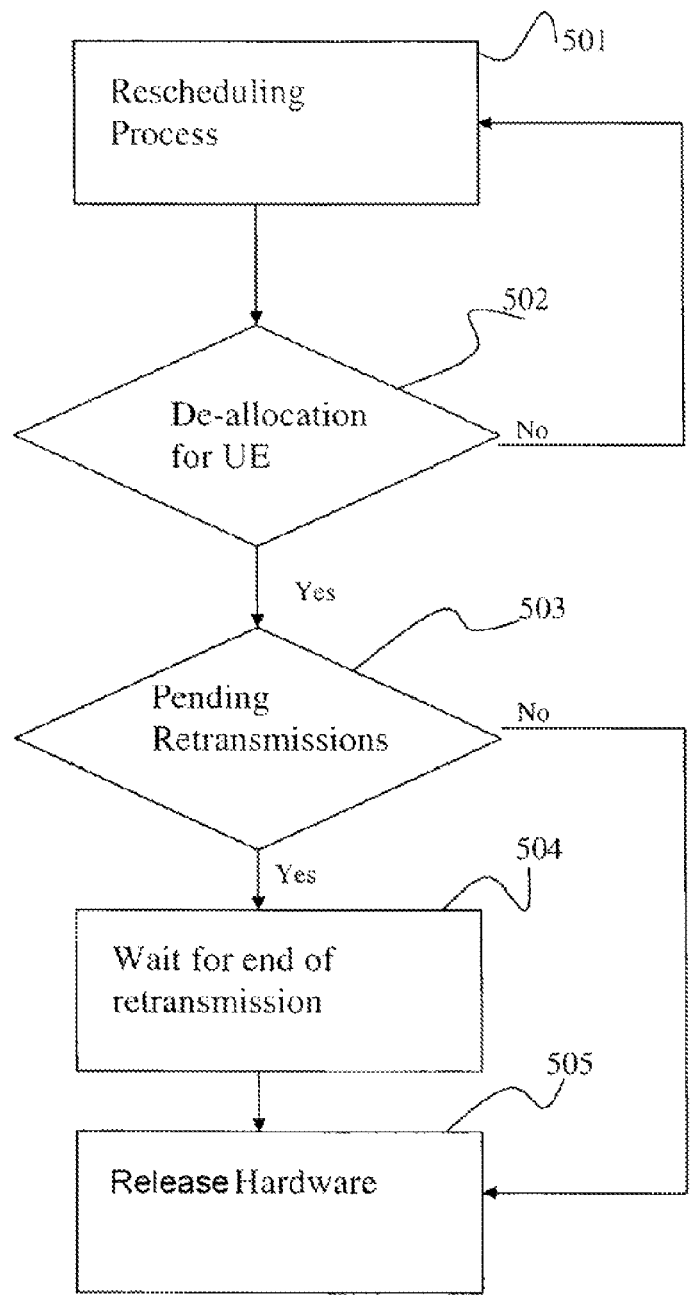
FIG. 5 is a flowchart of a method according to one aspect of the invention.

FIG. 5 is a schematic flow diagram according to one aspect of the present invention. A rescheduling process 501 continuously monitors loads and requests for increased grants from user equipment and decides whether rescheduling is necessary. If it is decided 502 that a user should have a reduced grant and that corresponding hardware needs to be de-allocated, a check 503 is made for that particular user equipment if any retransmissions are pending. If not the corresponding hardware is de-allocated 505 else the method waits until the pending retransmissions are finished in step 504. The step 504 may, in one variation involve a simple timer set to the maximum time interval allowed for retransmissions, or may be a detection process detecting when all retransmissions are finished. The detection process may be slightly more efficient since it may detect that the retransmissions are finished after only one retransmission, while the timer need to be set to deal with the maximum number of retransmissions, for instance four, to cover all re-transmission cases.

In this way the RBS 101 is able to successfully receive the retransmissions from the first UE 104 since the hardware is not de-allocated until all retransmissions are finished. Thus, RLC retransmissions may be reduced, since, if the hardware was de-allocated immediately the RBS would not be able to decode the retransmission due to lack of hardware resources, which eventually would invoke an RLC retransmission. This would mean significantly longer delays and degraded quality of service.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A network node for communicating over an air interface with a first mobile user terminal, the network node comprising:
a hardware pool comprising hardware resources for communicating with a plurality of mobile user terminals over the air interface;
a scheduler configured to allocate and de-allocate at least a first hardware resource from the pool of hardware resources for communicating with the first mobile user terminal, wherein the scheduler includes a delayer configured to delay the de-allocation of an allocated hardware resource when delayed de-allocation of the allocated hardware resource is needed;
a detector configured to detect whether the mobile user terminal will continue to utilize the allocated hardware resource after a scheduled de-allocation for transmitting pending retransmissions; and
a rate detector configured to estimate transmission rates;
wherein the delayer is configured to delay de-allocation of the hardware resource when the mobile user terminal will continue to utilize the allocated hardware resource after the scheduled de-allocation for transmitting pending retransmissions, and the estimated transmission rate of the retransmissions is larger than a threshold value.

2. The network node according to claim 1, wherein the scheduler is configured to allocate a first hardware resource to support a first transmission rate before de-allocation and to allocate a second hardware resource to support a second lower transmission rate after de-allocation, wherein when the transmission rate of the re-transmissions is less than the second lower transmission rate, the scheduler is configured to de-allocate the first hardware resource without delay.

3. A network node for communicating over an air interface with a first mobile user terminal, the network node comprising:
   a hardware pool comprising hardware resources for communicating with a plurality of mobile user terminals over the air interface; and
   a scheduler for allocating and de-allocating at least a first hardware resource from the pool of hardware resources for communicating with the first mobile user terminal, wherein the scheduler includes a delayer for delaying the de-allocation of an allocated hardware resource if delayed de-allocation of the allocated hardware resource is needed, wherein the scheduler is configured to:
   allocate a first transmission rate to the first mobile user terminal by sending a grant message indicating the first transmission rate to the first mobile terminal over the air interface and by allocating sufficient hardware resources from the hardware pool to receive data transmitted from the first mobile user terminal to the network node with the first transmission rate;
   receive an indication that the allocated transmission rate for the first mobile user terminal is too high;
   allocate a second transmission rate to the first mobile user terminal in response to receiving the indication, wherein the second transmission rate is lower than the first transmission rate, by sending a grant message indicating the second rate to the first mobile terminal; and
   de-allocate hardware resources not required for transmitting with the second transmission rate only after all retransmissions are completed for the first mobile user terminal.

4. The network node according to claim 3, wherein the network node further comprises a receiver configured to receive requests for transmission rate capacity from a second mobile user terminal, and the scheduler is configured to indicate that the allocated transmission rate for the first mobile user terminal is too high if the second mobile user terminal is in need of an increased transmission rate.

5. The network node according to claim 3, wherein the network node further comprises an overload detector provided to indicate that the allocated transmission rate for the first mobile user terminal is too large if an overload situation occurs.

6. A method performed by a network node for allocating and de-allocating hardware resources from a hardware pool in the network node, wherein the network node communicates with a mobile user terminal over an air interface, said method comprising the steps of:
   allocating at least a first hardware resource from the pool of hardware resources for communicating with the first mobile user terminal;
   detecting whether the mobile user terminal will have pending retransmissions after a scheduled de-allocation of the first hardware resource;
   estimating a transmission rate of the retransmissions;
   when the mobile user terminal will have pending retransmissions after the scheduled de-allocation of the first hardware resource, and the estimated transmission rate of the retransmissions is larger than a threshold value, delaying the de-allocation of the first hardware resource until the mobile user terminal has completed the retransmissions; and
   when the mobile user terminal will not have pending retransmissions after the scheduled de-allocation of the first hardware resource, or when the estimated transmission rate of the retransmission is not larger than the threshold value, de-allocating the first hardware resource at the scheduled de-allocation without delay.

* * * * *